July 14, 1925.
H. GILLESPIE
FASTENER
Filed Dec. 26, 1924
1,546,227
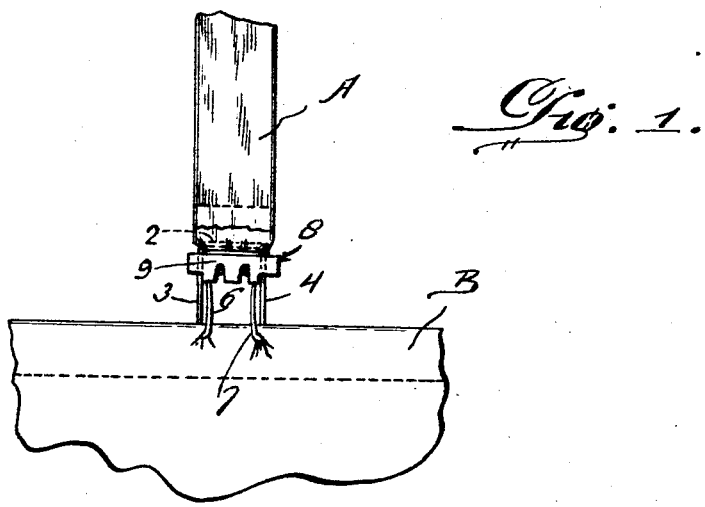
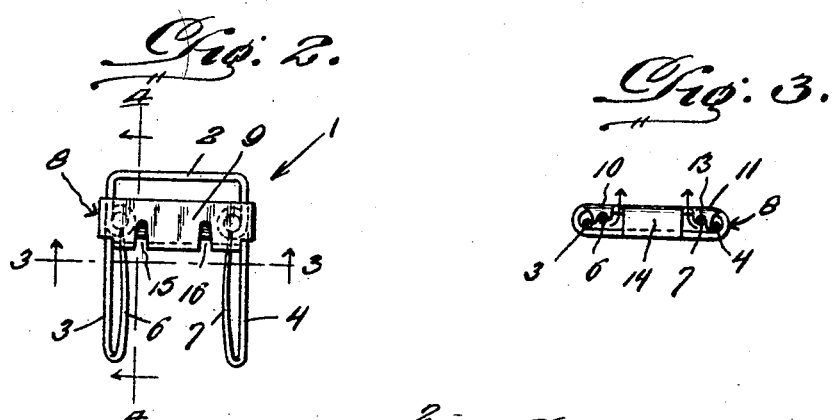
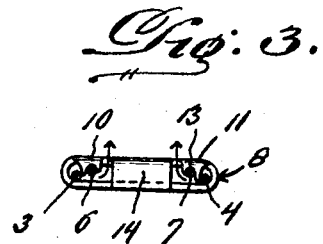
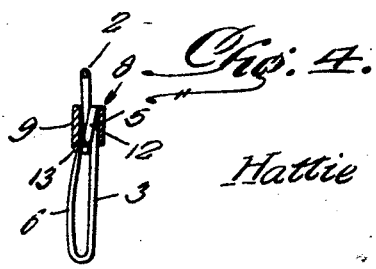
Hattie Gillespie,
Inventor Patented July 14, 1925.

1,546,227

UNITED STATES PATENT OFFICE.

HATTIE GILLESPIE, OF JACKSONVILLE, FLORIDA.

FASTENER.

Application filed December 26, 1924. Serial No. 758,213.

*To all whom it may concern:*

Be it known that I, HATTIE GILLESPIE, a citizen of the United States, residing at Jacksonville, in the county of Duval and State of Florida, have invented certain new and useful Improvements in a Fastener, of which the following is a specification.

This invention relates to improvements in fasteners and has for its principal object to provide a simple and efficient means for fastening the free ends of the shoulder straps to a brassière and supporters or the like.

One of the important objects of the present invention is to provide a fastener of the above mentioned character, which is of such construction as to permit the same to be readily disengaged, whereby the shoulder straps may be detached from the brassière for the purpose of laundering the same or replacing the old ones with new ones.

A further object of the invention is to provide a fastener of the above mentioned character wherein means is associated therewith for preventing the accidental opening of the same when in use, the fastener being simple in construction, inexpensive, strong and durable and furthermore adapted for the purposes for which it is designated.

Other objects and advantages of this invention will become apparent during the course of the following description.

In the accompanying drawing forming a part of the specification and in which like numerals designate like parts throughout the same:

Figure 1 is a side elevation of my improved fastener showing the same in use, a portion of the shoulder strap being broken away.

Figure 2 is a side elevation of the fastener per se.

Figure 3 is a sectional view taken approximately on line 3—3 of Figure 2 looking in the direction of the arrow, and Figure 4 is a sectional view taken approximately on line 4—4 of Figure 2 looking in the direction of the arrows.

In the drawing, wherein for the purpose of illustration is shown the preferred embodiment of my invention, the fastener designated generally by the numeral 1 comprises a single strand of wire which is bent to provide a substantially inverted U-shaped member, the crown portion thereof being indicated at 2 and the arms at 3 and 4 respectively. The arms are each provided with a coil 5 adjacent the crown portion 2 whereby the same are rendered resilient. The arms are of considerable length, and the ends thereof are bent back upon itself to provide a pair of opposed spring pins 6 and 7 respectively. The free ends of the pins are pointed and terminate at a point adjacent the coils 5 provided in the arms of the U-shaped member as more clearly illustrated in Figure 2.

The fastener is adapted to be attached to each of the free ends of the usual shoulder straps in any suitable manner, and I do not wish to limit myself to the particular manner in which the fastener is associated with the shoulder strap.

For the purpose of preventing the displacement of the fastener when in use, I provide a metallic band such as is shown at 8, the same being adapted to extend around the arms 3 and 4 of the inverted U-shaped member 2 at a point whereby the coiled portion 5 will be enclosed. Each end of the shoulder strap A engages the crown portion 2 of the fastener. This construction is clearly illustrated in Figures 2 and 4. Extending inwardly from the bottom edge of the forward side 9 of the band 8 adjacent the ends thereof are the lips 10 and 11 respectively. The inner ends thereof terminate at a point adjacent the rear side 10 of the band 8 and a suitable notch such as is illustrated at 13 is formed in the free end of each of the lips, the purpose thereof will hereinafter be more fully described.

A rearwardly extending tongue 14 is formed on the bottom edge of the front side 9 of the band 8 and the free end of the tongue is disposed over the bottom edge of the rear side 12 of the band. The tongue 14 is preferably arranged at the intermediate portion and is spaced from the lips 10 and 11 as more clearly illustrated in Figure 3. Vertically extending slots 15 and 16 are provided in the forward side 9 of the band 8 adjacent the lips 10 and 11 respectively as is clearly illustrated in Figure 2.

Normally, the pointed ends of the pins are disposed within the band 8 and are seated in the notches 13 formed in the inner ends of the respective lips. When it is desired to unfasten the shoulder straps from the brassière, the pins 6 and 7 are moved toward each other after the same have been depressed to move the free ends of the pins out of engagement with the notches 13 in the lips 10 and 11 respectively. The free ends of the pins are then adapted to be brought out of engagement with the band 8 by moving the pins laterally through the slots 15 and 16 as is obvious from the construction illustrated, and as further indicated by the arrows in Figure 3.

In securing the fastener in position, the pointed ends of the pins are first inserted in the slots and are then moved in opposite directions between the sides of the band 8 until the free ends of the pins are seated in the notches provided therefor in the respective lips.

It will thus be seen from the foregoing description, that a fastener has been provided which will prevent the accidental disengagement of the shoulder straps from the brassière, yet permitting the same to be readily detached therefrom whenever it becomes necessary.

While I have shown the preferred embodiment of my invention, it is to be understood that various changes in the size, shape and arrangement of parts may be resorted to without departing from the spirit of the invention and the scope of the apended claims.

Having thus described the invention, what I claim is:—

1. A fastener of the class described comprising a single strand of wire bent to provide a substantially inverted U-shaped member, the free ends of the arms thereof being bent back upon themselves to provide a pair of opposed spring pins, means associated with the arms of the inverted U-shaped member for normally holding the pins in a closed position, said means comprising a band encircling said arms, lips extending inwardly from the bottom of one of the sides of the band and terminating at a point adjacent the opposite side of the band, each of said lips having a notch formed in the free end thereof in which the upper end of each pin is normally seated.

2. A fastener of the class described comprising a single strand of wire bent to provide a substantially inverted U-shaped member, the free ends of the arms thereof being bent back upon themselves to provide a pair of opposed spring pins, means associated with the arms of the inverted U-shaped member for normally holding the pins in a closed position, said means comprising a band encircling said arms, lips extending inwardly from the bottom of one of the sides of the band and terminating at a point adjacent the opposite side of the band, each of said lips having a notch formed in the free end thereof in which the upper end of each pin is normally seated, said band being further provided with means for facilitating the disengagement of the free ends of the pins therefrom.

3. A fastener of the class described comprising a single strand of wire bent to provide a substantially inverted U-shaped member, the arms being coiled at a point adjacent the crown portion, the free ends of the arms being bent back upon themselves to provide a pair of opposed spring pins, a band encircling said arms at a point adjacent the crown portion, lips extending rearwardly from the bottom edge of the forward side of the band and terminating at a point adjacent the rear side of the band, the free end of each lip being provided with a notch to receive the free end of the respective pins for normally holding the same in a closed position, the free ends of said pins being adapted for disengagement with said notches and further adapted for lateral movement through slots provided in the forward side of the band whereby the pins are disengaged from the band and opening the fastener.

In testimony whereof I affix my signature.

HATTIE GILLESPIE.